US007384337B2

(12) United States Patent
Thomas

(10) Patent No.: US 7,384,337 B2
(45) Date of Patent: Jun. 10, 2008

(54) WAGERING GAME PROVIDING REWARDS INDEPENDENT FROM GAMING SESSION

(75) Inventor: Alfred Thomas, Las Vegas, NV (US)

(73) Assignee: WMS Gaming Inc., Waukegan, IL (US)

( * ) Notice: Subject to any disclaimer, the term of this patent is extended or adjusted under 35 U.S.C. 154(b) by 822 days.

(21) Appl. No.: 10/758,151

(22) Filed: Jan. 15, 2004

(65) Prior Publication Data

US 2005/0159207 A1 Jul. 21, 2005

(51) Int. Cl.
*A63F 13/00* (2006.01)

(52) U.S. Cl. ........ 463/27

(58) Field of Classification Search ........ 463/12, 463/13, 16–20, 25–27, 42

See application file for complete search history.

(56) References Cited

U.S. PATENT DOCUMENTS 4,669,730 A 6/1987 Small
4,815,741 A 3/1989 Small
5,046,737 A 9/1991 Fienberg
5,118,109 A 6/1992 Gumina
5,129,652 A 7/1992 Wilkinson
5,179,517 A 1/1993 Sarbin et al.
5,397,125 A 3/1995 Adams
5,645,485 A 7/1997 Clapper, Jr.
5,657,899 A 8/1997 Stoken
5,743,524 A 4/1998 Nannicola
5,749,784 A 5/1998 Clapper, Jr.
5,791,990 A 8/1998 Schroeder et al.
5,916,024 A 6/1999 Von Kohorn
5,928,082 A 7/1999 Clapper, Jr.
6,015,344 A 1/2000 Kelly et al.
6,056,289 A 5/2000 Clapper, Jr.
6,068,552 A 5/2000 Walker et al.
6,089,976 A 7/2000 Schneider et al.
6,102,395 A 8/2000 Such
6,110,043 A 8/2000 Olsen
6,113,098 A 9/2000 Adams
6,173,267 B1 1/2001 Cairns
6,203,010 B1 3/2001 Jorasch et al.
6,238,288 B1 5/2001 Walker et al.
2001/0039513 A1 11/2001 Erlichson et al.
2002/0077168 A1 6/2002 Jones et al.

(Continued)

FOREIGN PATENT DOCUMENTS

EP 1343125 A2 9/2003

(Continued)

*Primary Examiner*—Scott E. Jones
(74) *Attorney, Agent, or Firm*—Nixon Peabody LLP

(57) ABSTRACT

A wagering game is comprised of a basic game, a progressive game with a progressive payout, and an input device for identifying players who are playing the basic game and who become eligible for the progressive payout. The progressive payout can be awarded to a player during a selected time period. But, if the progressive payout is not awarded during the selected time period, the progressive payout is awarded to an eligible player that is randomly selected in a drawing. The progressive payout can have first and second payouts that are awarded, respectively, during a first time period (e.g., per week) and a second time period (e.g., per month). Thus, the player does not need to be at the gaming terminal to win the progressive jackpot.

53 Claims, 5 Drawing Sheets

U.S. PATENT DOCUMENTS

| | | | |
|---|---|---|---|
| 2002/0093136 | A1 | 7/2002 | Moody |
| 2002/0107065 | A1 | 8/2002 | Rowe |
| 2003/0036427 | A1 | 2/2003 | Brandstetter et al. |
| 2003/0060256 | A1 | 3/2003 | Joshi |
| 2003/0100362 | A1 | 5/2003 | Horniak et al. |

FOREIGN PATENT DOCUMENTS

| | | | |
|---|---|---|---|
| EP | 1513118 | A2 | 3/2005 |
| WO | 2004/080551 | A3 | 9/2004 |
| WO | 2005/029424 | A1 | 3/2005 |

WAGERING GAME PROVIDING REWARDS INDEPENDENT FROM GAMING SESSION

FIELD OF THE INVENTION

The present invention relates to gaming terminals and gaming systems and, in particular, to a progressive wagering game that allows a player to remain eligible for a progressive jackpot after his or her gaming session at a gaming terminal has concluded.

BACKGROUND OF THE INVENTION

Gaming machines, such as slot machines, video poker machines, and the like, have been a cornerstone of the gaming industry for several years. Generally, the popularity of such machines with players is dependent on the likelihood (or perceived likelihood) of winning money at the machine and the intrinsic entertainment value of the machine relative to other available gaming options. Where the available gaming options include a number of competing machines and the expectation of winning each machine is roughly the same (or believed to be the same), players are most likely to be attracted to the most entertaining and exciting of the machines.

Consequently, shrewd operators strive to employ the most entertaining and exciting machines available because such machines attract frequent play and, hence, increase profitability to the operator. In the competitive gaming machine industry, there is a continuing need for gaming machine manufacturers to produce new types of games, or enhancements to existing games, which will attract frequent play by increasing the entertainment value and excitement associated with the game.

One concept that has been successfully employed to enhance the entertainment value of a game is that of a "secondary" or "bonus" game which may be played in conjunction with a "basic" game. The bonus game, which is entered upon the occurrence of a selected event or outcome of the basic game, may comprise any type of game, either similar to or completely different from the basic game. Such a bonus game produces a significantly higher level of player excitement than the basic game because it provides a greater expectation of winning than the basic game.

Another concept that has been employed to enhance player entertainment is the use of progressive games. In the gaming industry, a "progressive" game involves collecting coin-in data from participating gaming device(s) (e.g., slot machines), contributing a percentage of that coin-in data to a progressive jackpot amount, and awarding that jackpot amount to a player upon the occurrence of a certain jackpot-won event. A jackpot-won event typically occurs when a "progressive winning position" is achieved at a participating gaming device. If the gaming device is a slot machine, a progressive winning position may, for example, correspond to alignment of progressive jackpot reel symbols along a certain payline. The initial progressive jackpot is a predetermined minimum amount. That jackpot amount, however, progressively increases as players continue to play the gaming machine without winning the jackpot. Further, when several gaming machines are linked together such that several players at several gaming machines compete for the same jackpot, the jackpot progressively increases at a much faster rate, which leads to further player excitement.

In the existing progressive games, the progressive jackpot is available to anyone who is playing at a gaming terminal that is participating in the progressive game. While playing at the gaming terminals, players participating in the progressive game are excited about the possibility of winning a progressive jackpot amount that continues to increase as players continue to play. Once players conclude their gaming sessions at the gaming terminals, however, they often feel as though they have lost all chances of winning, and their sense of excitement is diminished. In particular, any expectations the players have of winning the progressive game are ended once they leave the gaming terminal.

While some progressive game features provide some enhanced excitement, there is a continuing need to develop new features for progressive games to satisfy the demands of players and operators. Preferably, such new features for progressive games will further enhance the level of player excitement. The present invention is directed to satisfying these needs in that it enables players to continue to feel the sense of excitement after the progressive gaming session has ended by providing a novel progressive game that allows players to continue to be eligible to win a progressive jackpot amount after their gaming session has ended.

SUMMARY OF THE INVENTION

The present invention relates to a gaming terminal and method for playing a wagering game at a gaming terminal that is comprised of a basic game, a progressive payout, and an input device for identifying players who are playing the basic game and who become eligible for a progressive payout. The progressive payout can be awarded to a player during a selected time period. But, if the progressive payout is not awarded during the selected time period, then the progressive payout is awarded to an eligible player that is randomly selected in a drawing. The progressive payout can have first and second payouts that are awarded, respectively, during a first time period (e.g., per week) and a second time period (e.g., per month). Thus, the player does not need to be at the gaming terminal to win the progressive jackpot; rather, he or she can win it while at home or at work.

The present invention also relates to a gaming system for playing a progressive game that includes a progressive game controller that is connected to a plurality of gaming terminals, each terminal having an input device for identifying players who are competing for a progressive payout. A database for storing player-identification information obtained from the input device is connected to the progressive game controller. If the progressive payout is not awarded during a selected time period, then the progressive game controller randomly selects one of the players who is eligible for the progressive payout, and awards the progressive payout to that player.

Furthermore, the present invention relates to a method for playing a wagering game that has a progressive payout that can be awarded to a randomly selected player who concluded playing the wagering game, and who is not present at the gaming terminal when the random selection is made.

The above summary of the present invention is not intended to represent each embodiment or every aspect of the present invention. The detailed description and figures will describe many of the embodiments and aspects of the present invention.

BRIEF DESCRIPTION OF THE DRAWINGS

The foregoing and other advantages of the invention will become apparent upon reading the following detailed description and upon reference to the drawings.

Figure 1:
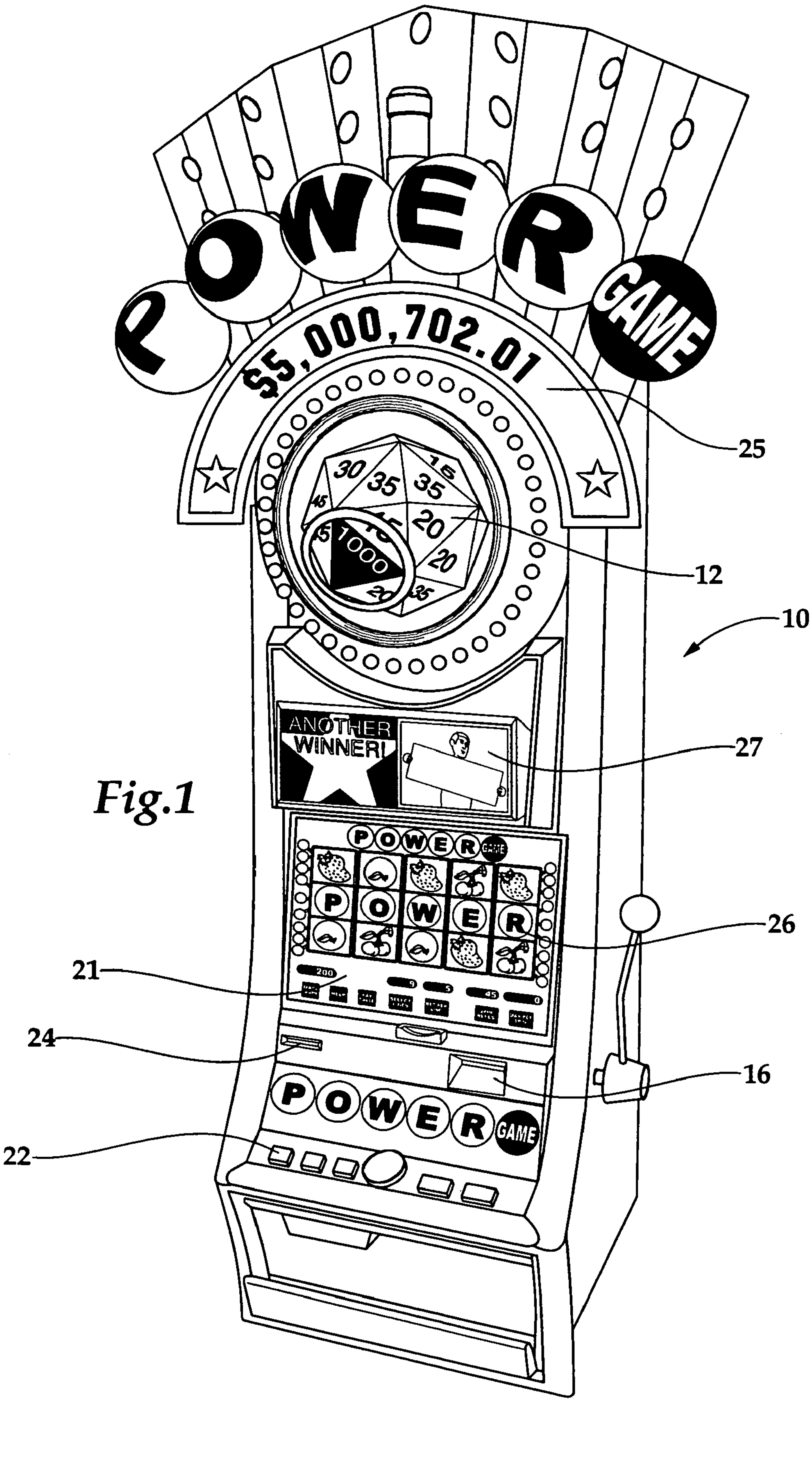
FIG. 1 illustrates a gaming terminal that is useful for operating an enhanced progressive game in accordance with the present invention.

While the invention is susceptible to various modifications and alternative forms, specific embodiments have been shown by way of example in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DESCRIPTION OF ILLUSTRATIVE EMBODIMENTS

FIG. 1 shows a perspective view of a typical gaming terminal 10 used by gaming establishments, such as casinos. With regard to the present invention, the gaming terminal 10 may be any type of gaming terminal and may have varying structures and methods of operation. For example, the gaming terminal 10 may be a mechanical gaming terminal configured to play mechanical slots, or it may be an electromechanical or electrical gaming terminal configured to play a video casino game, such as blackjack, slots, keno, poker, etc.

As shown, the gaming terminal 10 has a top box including a rotating element 12 for playing a bonus game that may be played during or after the player has played the basic wagering game associated with the gaming terminal 10. The gaming terminal 10 includes input devices, such as a wager acceptor 16, a touch screen 21, a push-button panel 22, and a player-identification card reader 24. For outputs, the gaming terminal 10 includes a progressive game display 25 for displaying the value of a progressive game, a main display 26 for displaying information about the wagering game, and a secondary display 27 that can display game-related information or other entertainment features. While these typical components found in the gaming terminal 10 are described below, it should be understood that numerous other elements may exist and may be used in any number of combinations to create various forms of a gaming terminal.

The wager acceptor 16 may be provided in many forms, individually or in combination. The wager acceptor 16 may include a coin slot acceptor or a note acceptor to input value to the gaming terminal 10. Or, the wager acceptor 16 may include a card-reading device for reading a card that has a recorded monetary value with which it is associated. The card may also authorize access to a central account, which can transfer money to the gaming terminal 10.

The push button panel 22 is typically offered, in addition to the touch screen 21, to provide players with an option on how to make their game selections. Alternatively, the push button panel 22 provides inputs for one aspect of operating the game, while the touch screen 21 allows for inputs needed for another aspect of operating the game.

The operation of the basic wagering game is displayed to the player on the main display 26. The main display 26 may take the form of a cathode ray tube (CRT), a high resolution LCD, a plasma display, LED, or any other type of video display suitable for use in the gaming terminal 10. As shown, the main display 26 includes a touch screen 21 overlaying the entire monitor (or a portion thereof) to allow players to make game-related selections. Alternatively, the gaming terminal 10 may have a number of mechanical reels to display the game outcome.

The player-identification card reader 24 allows for the identification of a player by reading a card with information indicating his or her true identity. Currently, the identification is used by casinos for rewarding certain players with complimentary services or special offers. For example, a player may be enrolled in the gaming establishment's players' club and may be awarded certain complimentary services as that player collects points in his or her player-tracking account. The player inserts his or her card into the player-identification card reader 24, which allows the casino's computers to register that player's wagering at the gaming terminal 10. The gaming terminal 10 may use the secondary display 27 for providing the player with information about his or her account or other player-specific information.

Figure 2:
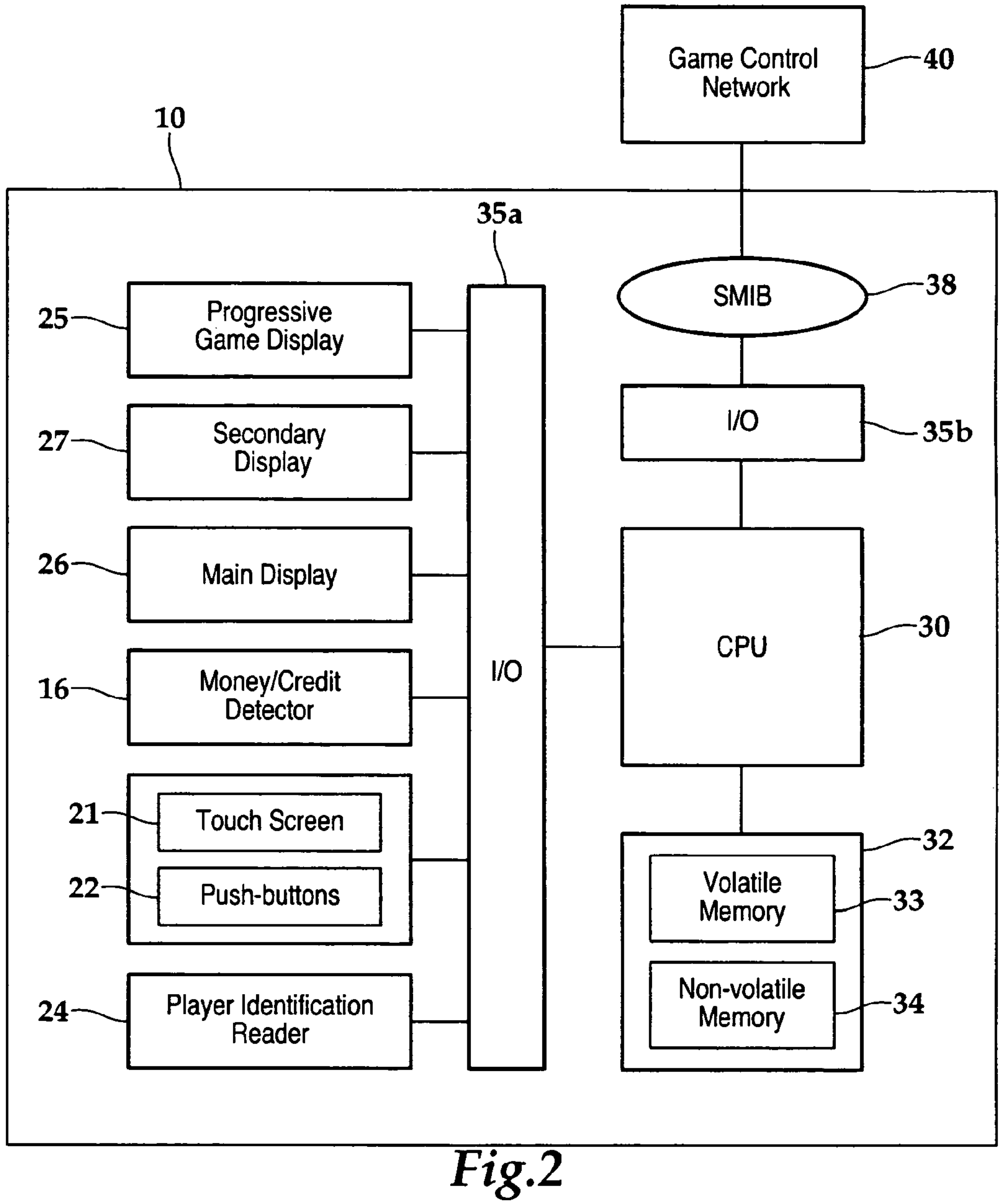
FIG. 2 illustrates a control system that is used in conjunction with the gaming terminal of FIG. 1.

As shown in FIG. 2, the various components of the gaming terminal 10 are controlled by a central processing unit (CPU) 30 (such as a microprocessor or microcontroller). To provide the gaming functions, the CPU 30 executes a game program. The CPU 30 is also coupled to or includes a system memory 32. The system memory 32 may comprise a volatile memory 33 (e.g., a random-access memory (RAM)) and a non-volatile memory 34 (e.g., an EEPROM). It should be appreciated that the CPU 30 may include one or more microprocessors. Similarly, the memory 32 may include multiple RAM and multiple program memories.

Communications between the peripheral components of the gaming terminal 10 and the CPU 30 occur through input/output (I/O) circuits 35*a*. As such, the CPU 30 also controls and receives inputs from the peripheral components of the gaming terminal 10. Further, the CPU 30 communicates with external systems via the I/O circuits 35*b*. Although the I/O circuits 35 may be shown as a single block, it should be appreciated that the I/O circuits 35 may include a number of different types of I/O circuits.

As will be discussed in more detail below with respect to FIG. 5, the gaming terminal 10 is typically operated as part of a game control network 40 having control circuitry and memory devices. The gaming terminal 10 often has multiple serial ports, each port dedicated to providing data to a specific host computer system that performs a specific function (e.g., accounting, player-tracking, or a progressive game control system, etc). To set up a typical serial communication hardware link to the host system, the typical RS-232 point-to-point communication protocol that is often present in the gaming terminal 10 is converted to an RS-485 (or RS-485-type) master-slave protocol so as to take advantage of some of the advantages of the RS-485 capability (e.g., multi-drop capability that allows many gaming terminals 10 to communicate with the game control network 40). To perform this function, a Slot Machine Interface Board (SMIB) 38 is used by the gaming terminal 10. One SMIB 38 is typically present for each communication port in the gaming terminal 10. The SMIB 38 may poll the gaming terminal 10 for data, or the SMIB 38 may only listen for data being transmitted from the gaming terminal 10 as it is produced on an event-driven basis. This data is stored on the SMIB 38 and is accessible to the game control network 40 via the RS-485 side of the SMIB 38. It should be noted that the gaming terminal 10 can initially be designed to be configured for a typical RS-485 protocol, instead of the typical RS-232 protocol. Further, the gaming terminal 10 may simply be designed for an Ethernet connection, thereby eliminating the need for the SMIB 38.

Figure 3:
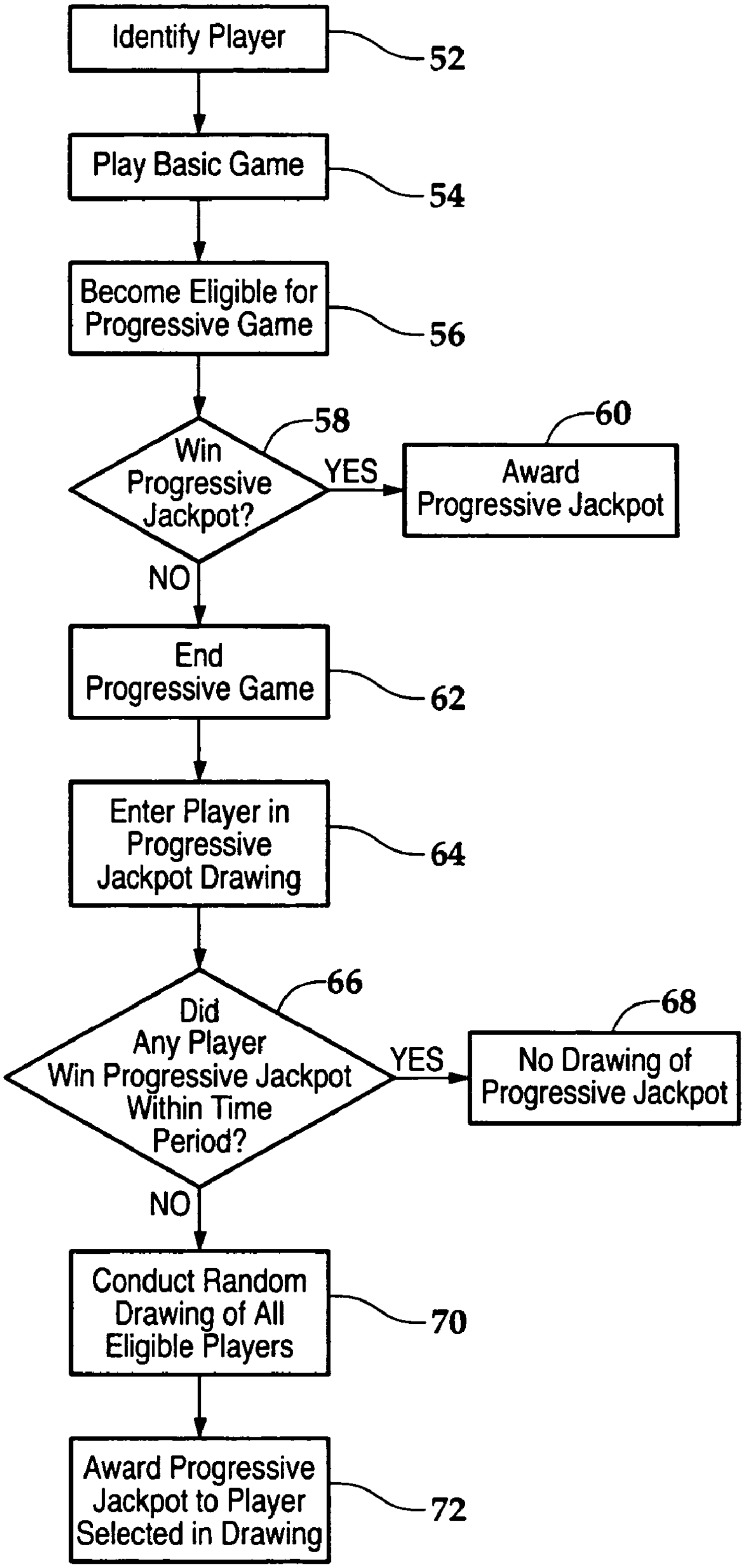
FIG. 3 illustrates an enhanced gaming method for awarding a progressive jackpot in accordance with the present invention.

FIG. 3 shows a method for playing an enhanced progressive wagering game in accordance with the present invention. The method includes awarding a jackpot to a progressive game player who may or may not be present at the gaming terminal 10. The method begins with identifying a player at step 52, such that the player's identity is known and, if needed, the player's wagering inputs can be recorded by the casino's gaming network. A player can be identified by inputting a tracking card into the player-identification card reader 24 or through a radio frequency ID device. Alternatively, the player manually enters his or her information into an electronic form at the gaming terminal 10 (e.g., via a touchscreen). In a further alternative, a player can input a pin number into a player-identification input device, or a player can provide a biometric marker, such as a fingerprint, onto a player-identification input device on the gaming terminal 10. Similarly, these devices can provide identification of the player, and allow tracking of the player's wager inputs, particularly for participation in the progressive games.

Following identification of the player at step 52 and a wager input by the player at the gaming terminal 10, the player plays the basic game at step 54. The basic game typically include a plurality of symbols that indicate a randomly selected outcome. The randomly selected outcome is generated in response to the player's wager input. The basic game may include a start bonus game outcome, which allows the player to compete in a bonus game.

At some point while the player is at the gaming terminal 10, the player may become eligible to play the progressive game at step 56. Eligibility may be triggered by a variety of events. For example, the player may become eligible to play the progressive game by simply being identified (via one of the methods described herein) and playing the basic game, or by inputting an additional wager amount during the basic game. Alternatively, a player may become eligible to play the progressive game as a result of achieving a certain outcome in the basic game, or by inputting an additional wager amount and achieving a certain outcome in the basic game. In sum, there are a variety of triggering events for allowing the player to compete for the progressive jackpot.

After the player is eligible for and plays the progressive game, at step 58, it is then determined whether the player has won the progressive game. If the player has won the progressive game, the player is awarded the progressive jackpot at that time at step 60. If the player has not won the progressive game, then the progressive game ends at step 62. The player may elect to continue playing the basic game at step 54 with another chance at becoming eligible to win the progressive jackpot, or the player may end his or her gaming session. At this time, the player may be instructed, at the gaming terminal 10, that he or she is still eligible for the progressive payout if it is not awarded during a predetermined time period.

After the progressive game has ended and the player has not been awarded the progressive jackpot at step 62, the player is automatically entered into a progressive jackpot drawing at step 64 for which the player is eligible to win the progressive jackpot even after he or she has concluded the gaming session. In one embodiment, the player is entered into the progressive jackpot drawing at the end of each unsuccessful attempt to win the progressive game jackpot.

In the event that no player wins the progressive jackpot at the end of a specified time period at step 66, a random drawing is held at step 70 for all eligible players who had competed for the progressive jackpot. Many options are available for this drawing, such as briefly halting all gaming sessions at all eligible gaming terminals to perform the random drawing. The random selection of a player from the field of eligible players in the drawing can be performed and displayed on the secondary display 27, and the identity of the winning player announced simultaneously. Alternatively, the random selection of the winning player can be announced at a later time. The progressive jackpot is then awarded to the player selected in the drawing at step 72. If the player is no longer at the casino, the casino may arrange to have the player transported back to the casino to receive his or her jackpot. If a player has won the progressive jackpot by the end of the specified time period, then no drawing is conducted as indicated by step 68.

In accordance with the present invention, multiple progressive jackpots may be awarded at selected time periods. The time periods may or may not be equal in duration. For example, a time period associated with a first progressive jackpot may be equal to a week; a time period associated with a second progressive jackpot may be equal to a month; and a time period associated with a third progressive jackpot may be equal to a year. When playing the progressive game, the player can be eligible for all three jackpots. From this example, if a first progressive jackpot is awarded to a player, then that player can be eligible for a random drawing for the second and third progressive jackpots, assuming that they are not awarded during their respective time periods. Thus, a player that plays a progressive game can become eligible for multiple progressive jackpots via multiple random drawings, which increases the excitement level and gives the player a greater expectation of winning. The excitement level is further enhanced by the opportunity to win a progressive jackpot even after the player's gaming session is concluded.

The amounts of multiple progressive jackpots may also vary. For instance, a first progressive payout may not be equal to a second progressive payout, and so on. The amounts may vary by an order of magnitude or more, and each may be funded by an equal or unequal portion of the players' wager inputs.

The method described in FIG. 3 provides the general steps of the present invention. The steps can be altered, and many other steps can be included. For example, in addition to displaying the outcome of the basic game on the main display 26, a picture or name of a previously selected player receiving the progressive jackpot from the drawing at step 70 may be displayed on the secondary display 27. This display of previous winners can serve to remind the player that progressive players can win while playing the progressive game at the gaming terminal 10 or even after the progressive game has ended and the player has left the gaming terminal 10. The displays increase the entertainment value of the gaming terminals and encourage players to play again so that they will be entered once more into the field of players competing for the progressive jackpot.

The secondary display 27 may also display the random drawing of all eligible players 70 by means of a live video feed. A player at a gaming terminal 10 can, therefore, watch while a player is being randomly selected (perhaps even himself or herself), which adds to the excitement associated with the progressive game and increases its entertainment value.

In another alternative, at step 64, the number of player entries into the random drawing can be changed based on predetermined criteria. For example, if a certain outcome is achieved during the basic game and the player is eligible for the progressive jackpot, then the player may receive two or three entries for the random drawing (not just one entry), assuming that he or she does not win the progressive jackpot. The gaming terminal 10 may be a slot machine and have an extra reel dedicated to the number of extra entries. Or, if the player has competed for the progressive jackpot a certain number of times in excess of a threshold (e.g., 100 attempts) within the predetermined time period, he or she may be awarded extra entries into the drawing.

Figure 4:
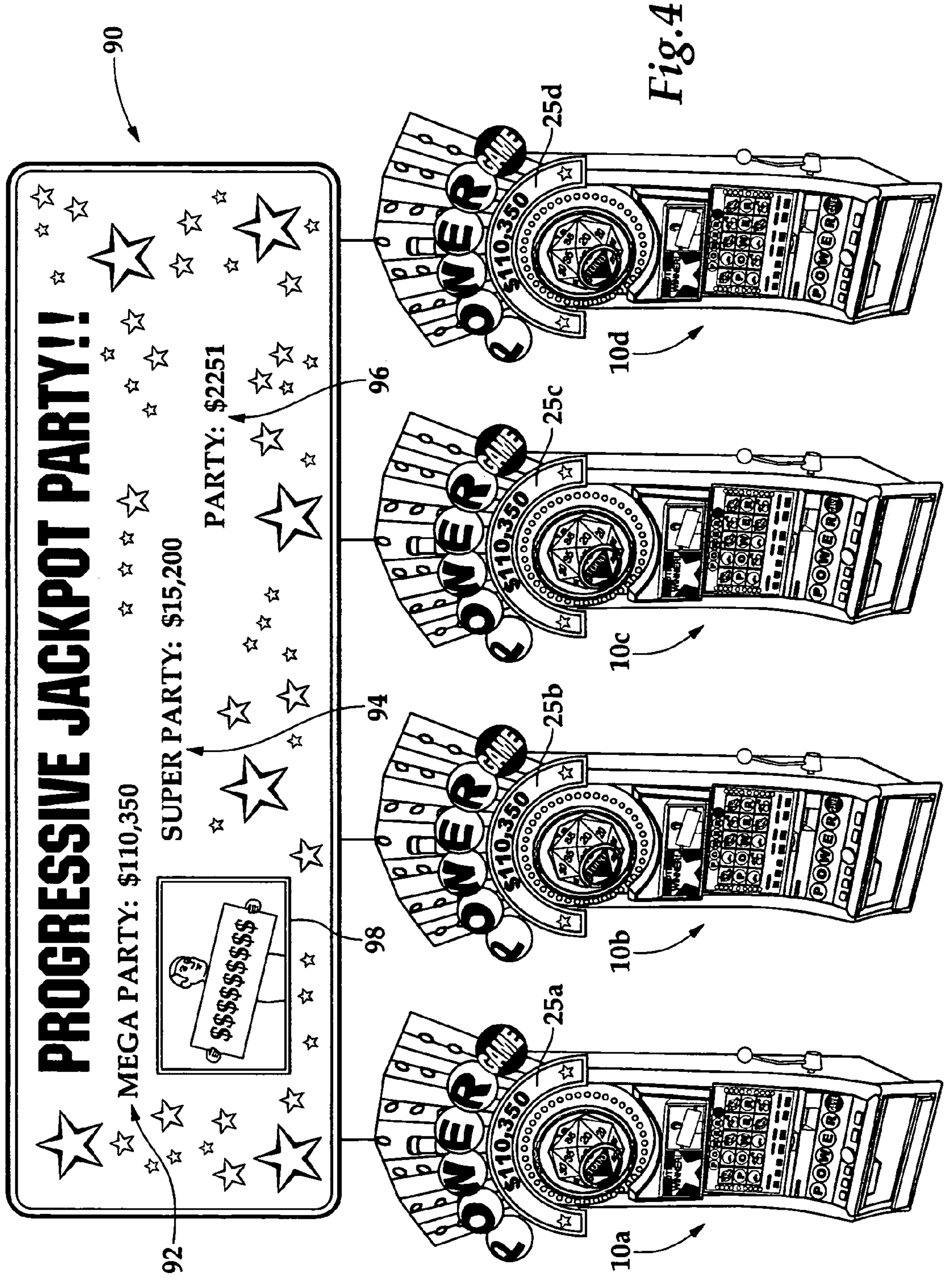
FIG. 4 illustrates a plurality of gaming terminals that are useful for operating an enhanced progressive game having multiple progressive payouts in accordance with the present invention.

FIG. 4 illustrates a plurality of gaming terminals 10*a*, 10*b*, 10*c*, 10*d* that can be used for operating the enhanced progressive game having multiple progressive payouts 92, 94, 96. The plurality of gaming terminals 10*a*, 10*b*, 10*c*, 10*d* may be coupled to a progressive game controller (such as one described as part of the WAP network of FIG. 5) that controls the overall function of the progressive game. The progressive game controller is coupled to a database that stores player-identification information. This information can be used to identify those players that are eligible for the progressive payouts. The identification of players can occur through the use of tracking cards, pin numbers, biometric markers, or any other method for identifying the player as described above. The progressive game controller randomly selects one of the players from the database in response to a progressive payout not being awarded during a selected time period, in accordance with the method described above.

The progressive game displays 25*a*, 25*b*, 25*c*, 25*d* that are attached to each of the plurality of gaming terminals 10*a*, 10*b*, 10*c*, 10*d* can display an amount of the single highest progressive payout (here the "Mega Party") or all of the progressive payouts. The plurality of gaming terminals 10*a*, 10*b*, 10*c*, 10*d* can be connected to signage 90 that displays each of the progressive payouts 92, 94, 96. The signage 90 can also include a display device 98 for displaying the identity of a randomly selected player receiving a progressive payout. The display device 98 and the secondary display devices 27 located at each of the plurality of gaming terminals 10*a*, 10*b*, 10*c*, 10*d* can also display the random selection of a player by live video feed. Thus, all players within viewing distance of the signage 90, even those not playing the progressive game, can get caught up in the excitement of winning a progressive jackpot. The progressive game controller also controls the signage 90. As the amount of the progressive jackpots increase, the progressive game controller changes the values on the signage 90 and the gaming terminals 10*a*, 10*b*, 10*c*, 10*d*.

Figure 5:
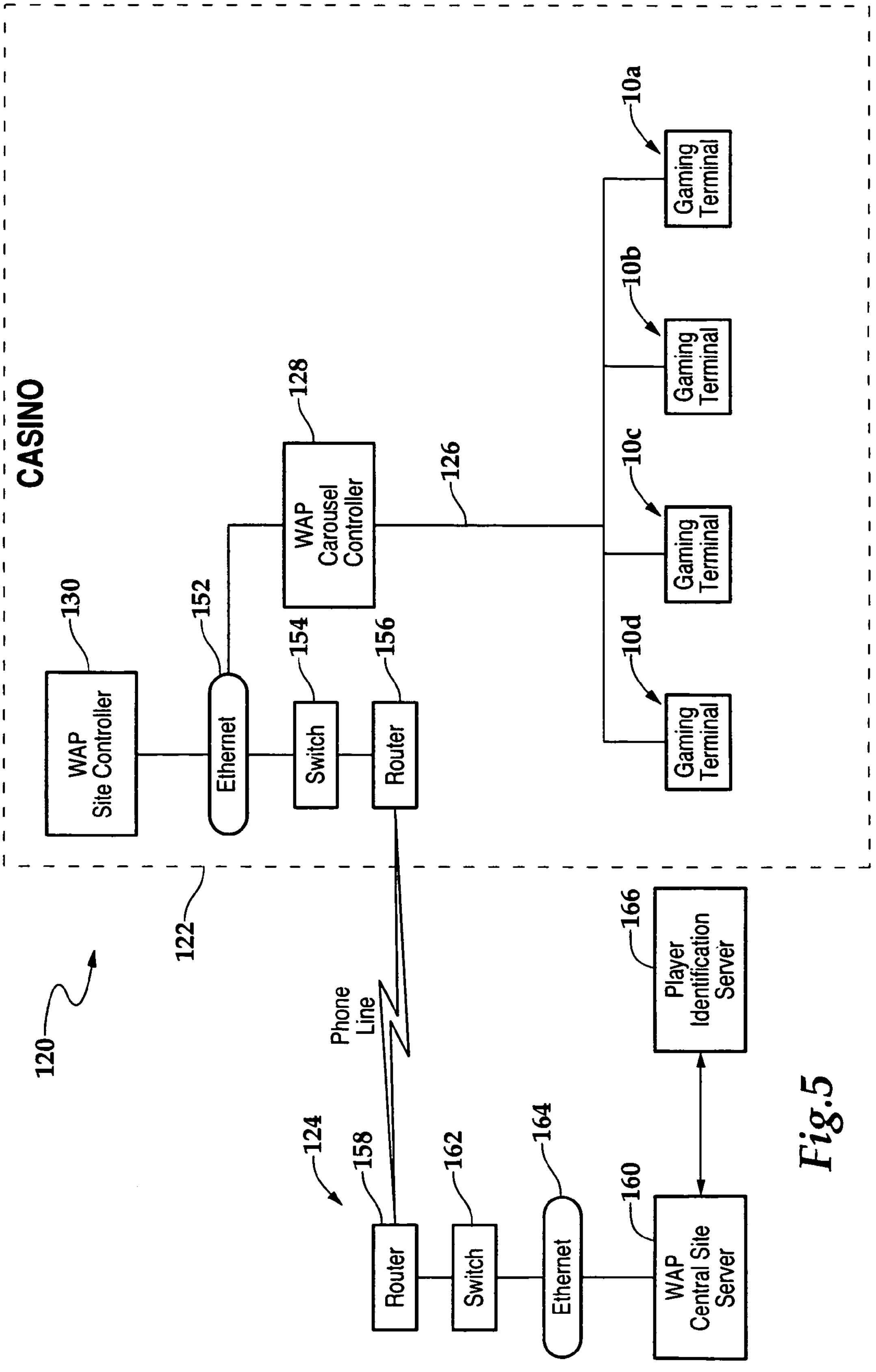
FIG. 5 illustrates one embodiment for a network that is useful for conducting the enhanced progressive games in accordance with the present invention.

FIG. 5 illustrates a network 120 that is useful for conducting the progressive games that are described above. As used herein, this network 120 will be referred to as the wide-area progressive ("WAP") network 120. The WAP network 120 typically includes components within a casino 122 and components at a remote location 124. Within the casino 122, a plurality of gaming terminals 10*a*, 10*b*, 10*c* are connected through a multi-drop serial line 126 to a WAP carousel controller 128. The multi-drop serial line 126 may be, for example, an RS-485 serial data line, which is compatible with and linked to the SMIB 38 (FIG. 2) within the gaming terminal 10. A WAP site controller 130 is connected to the WAP carousel controller 128 through an ethernet connection 152.

To link the WAP site controller 130 to the remote location 124, the casino 122 includes one or more switches 154 and routers 156. The router 156 within the casino 122 is connected through a phone line to a corresponding router 158 at the remote location 124. A WAP central site server 160 at the remote location 124 is coupled to the router 158 through a switch 162 and an ethernet connection 164. The WAP central site server 160 is connected to a player-identification server 166 to allow for the exchange of player data and progressive game data stored within the player-identification server 166.

In operation, a player identifies himself or herself to the WAP network 120 at the gaming terminal 10*a* through a player-tracking card for the casino, an identification card that is specific to the WAP network, entry of a login name and personal password or pin number, a radio frequency ID device, through biometric inputs, or any other method for identifying the player. The player's information is transmitted along the multi-drop serial line 126 and collected by the WAP carousel controller 128. As two of its functions, the WAP carousel controller 128 serves to quickly collect player-identification data from a plurality of gaming terminals 10*a*, 10*b*, 10*c*, 10*d* and to communicate progressive game information to selected ones of the gaming terminals 10*a*, 10*b*, 10*c*, 10*d* where progressive games are being played.

Once a player begins to play the progressive game at the gaming terminal 10*a*, the player-identification data is collected at the WAP site controller 130 and processed into a format for transmission to the WAP central site server 160 at the remote location 124. After transmission to the WAP central site server 160, the player-identification data is saved at the player-identification server 166.

After the player has completed the gaming session at the gaming terminal 10*a*, all information concerning the game play that occurred in the progressive game is transmitted from the WAP site controller 130 to the WAP central site server 160. Accordingly, updated player information and game play information regarding the progressive game is stored within the player-identification server 166.

If the progressive jackpot is not awarded to a player during a selected time period, the WAP central site server 160 uses the player-identification data that is saved at the player-identification server 166 to randomly select a player that is eligible for the progressive jackpot. The randomly selected player may or may not be at a gaming terminal, or even on the casino floor. The player can be identified, however, using player-identification data that was saved at the player-identification server 166. The player can then be notified of his or her selection as the progressive jackpot winner, and instructed on how to claim the jackpot.

Information related to the randomly selected player is then transmitted to the WAP site controller 130. Based on this information from the remote location 124, the WAP site controller 130, via the WAP carousel controller 128, communicates with the gaming terminals 10*a*, 10*b*, 10*c*, 10*d*. After the randomly selected player is awarded the progressive jackpot, the gaming terminals 10*a*, 10*b*, 10*c*, 10*d* may be instructed to display a picture of the randomly selected player with the progressive jackpot, i.e., a check for the amount of the progressive jackpot. Alternatively, the gaming machines 10*a*, 10*b*, 10*c*, 10*d* may be instructed to display a live video feed of the randomly selected player being awarded the progressive jackpot.

The present invention contemplates that the WAP central site server 160 can be linked to various types of gaming terminals in several casinos. Thus, players can play progressive games at several different casinos and qualify for the random drawing of the progressive game jackpot or jackpots.

The WAP network 120 in FIG. 5 is merely one example of many possible networks that can be developed to support a progressive game. Many other types of connections between the gaming terminals 10*a*, 10*b*, 10*c*, 10*d* and the WAP site controller 130 and between the WAP site controller 130 and the WAP central site server 160 can be utilized. Further, the WAP network 120 can be located entirely within the casino 122 and dedicated to only one casino 122, such that it performs all functions related to the progressive game within the casino 122. In such an embodiment, all information regarding the player and his or her chances for winning the drawing for the progressive jackpot are stored locally in databases within the casino 122.

While the present invention has been described with reference to one or more particular embodiments, those skilled in the art will recognize that many changes may be made thereto without departing from the spirit and scope of the present invention. For example, the drawings described above can award several players a portion of the progressive jackpot so as to increase the number of winners in the drawing. Each of these embodiments and obvious variations thereof is contemplated as falling within the spirit and scope of the claimed invention, which is set forth in the following claims.

What is claimed is:

1. A gaming terminal for playing a wagering game, comprising:

a basic game having a plurality of symbols that indicate a randomly selected outcome of said basic game, said randomly selected outcome being selected in response to a wager input;

an input device for identifying players who are playing at said gaming terminal and who are eligible for a progressive payout; and wherein said progressive payout has a first payout and a second payout, said first payout and said second payout being funded by a portion of said wager input, said first payout capable of being awarded only during a first time period and, if not awarded during said first time period, said first payout being randomly awarded to a player who competed for said first payout during said first time period, said second payout capable of being awarded only during a second time period and, if not awarded during said second time period, said second payout being randomly awarded to a player who competed for said second payout during said second time period.

2. The gaming terminal of claim 1, wherein said players become eligible for said progressive payout when said players play said basic game.

3. The gaming terminal of claim 1, wherein said players become eligible for said progressive payout when said players achieve a certain outcome in said basic game.

4. The gaming terminal of claim 1, wherein said players become eligible for said progressive payout when said players present an additional wager input.

5. The gaming terminal of claim 1, wherein said players become eligible for said progressive payout when said players are identified at said gaming terminal.

6. The gaming terminal of claim 1, wherein said input device accepts tracking cards presented by said players before playing said basic game.

7. The gaming terminal of claim 1, wherein said input device accepts personal identification numbers presented by said players before playing said basic game.

8. The gaming terminal of claim 1, wherein said input device accepts biometric markers presented by said players before playing said basic game.

9. The gaming terminal of claim 1, further comprising a first display device for displaying said randomly selected outcome, and a second display device for displaying a player who was randomly awarded said progressive payout after said first time period or said second time period.

10. The gaming terminal of claim 1, wherein said gaming terminal is connected to signage, said signage having a display device for displaying said first payout and said second payout.

11. The gaming terminal of claim 1, wherein said gaming terminal is connected to signage, said signage having a display device for displaying a player who was randomly awarded said progressive payout after said first time period or said second time period.

12. The gaming terminal of claim 1, wherein said player winning said first payout or said second payout is selected at a live drawing.

13. The gaming terminal of claim 12, wherein said selection of said player winning said first payout or said second payout at said live drawing is displayed by live video feed to a display device attached to said gaming terminal.

14. The gaming terminal of claim 12, wherein said selection of said player winning said first payout or said second payout at said live drawing is displayed by live video feed to a display device attached to signage that is connected to said gaming terminal.

15. The gaming terminal of claim 1, wherein said first time period is not equal to said second time period.

16. The gaming terminal of claim 15, wherein said first time period is equal to a week and said second time period is equal to a month.

17. The gaming terminal of claim 15, wherein said first time period is equal to a month and said second time period is equal to a year.

18. The gaming terminal of claim 1, wherein said first payout is not equal to said second payout.

19. The gaming terminal of claim 1, wherein said basic game includes outcomes that increase a player's chance of being randomly awarded said progressive payout after said first time period or said second time period.

20. A method for playing a wagering game, comprising:

conducting a basic game having a plurality of symbols that indicate a randomly selected outcome of the basic game, said randomly selected outcome being selected in response to a wager input;

presenting a progressive payout for which players are eligible, said progressive payout being funded by a portion of said wager input;

identifying said players who are playing at one or more gaming terminals for said progressive payout during a selected time period; and wherein, in response to said progressive payout not being awarded during said selected time period, randomly selecting one of said players identified as a player competing for said progressive payout during said selected time period and awarding at least a portion of said progressive payout to the selected player.

21. The method of claim 20, wherein said players become eligible for said progressive payout when said players play said basic game.

22. The method of claim 20, wherein said players become eligible for said progressive payout when said players achieve a certain outcome in said basic game.

23. The method of claim 20, wherein said players become eligible for said progressive payout when said players present an additional wager input.

24. The method of claim 20, wherein said players become eligible for said progressive payout when said players are identified at said one or more gaming terminals.

25. The method of claim 20, wherein said identifying includes reading tracking cards presented by said players.

26. The method of claim 20, wherein said identifying includes reading personal identification numbers presented by said players.

27. The method of claim 20, wherein said identifying includes reading biometric markers presented by said players.

28. The method of claim 20, further comprising displaying on display devices said randomly selected one of said players.

29. The method of claim 28, wherein said display devices are attached to signage that is connected to said one or more gaming terminals.

30. The method of claim 28, wherein said display devices are located on said one or more gaming terminals.

31. The method of claim 20, wherein said randomly selecting one of said players is performed at a live drawing.

32. The method of claim 31, wherein said randomly selecting one of said players at a live drawing is displayed by live video feed to a display device attached to said one or more gaming terminals.

33. The method of claim 31, wherein said randomly selecting one of said players at a live drawing is displayed by live video feed to a display device attached to signage that is connected to said one or more gaming terminals.

34. The method of claim 20, further comprising halting gaming sessions at said one or more gaming terminals to perform said randomly selecting one of said players.

35. The method of claim 20, wherein said selecting and awarding of said at least a portion of said progressive payout to the selected player includes selecting and awarding more than one player for said progressive payout.

36. A gaming system for playing a progressive game having a progressive payout, comprising:

a progressive game controller for controlling said progressive game having said progressive payout;

a plurality of gaming terminals coupled to said progressive game controller, each of said plurality of gaming terminals having an input device for receiving player-identification information for players competing for said progressive payout;

a database for storing said player-identification information for each player who plays said progressive game at one of said plurality of gaming terminals during a selected time period, said database being coupled to said progressive game controller; and wherein said progressive game controller randomly selects one of the players from said database in response to said progressive payout not being awarded during said selected time period, said selected one of said players receiving at least a portion of said progressive payout.

37. The gaming system of claim 36, wherein said input device accepts a tracking card presented by said player.

38. The gaming system of claim 36, wherein said input device accepts a personal identification number presented by said player.

39. The gaming system of claim 36 wherein said input device accepts a biometric marker presented by said player.

40. The gaming system of claim 36, further comprising a first display device present at each of said plurality of gaming terminals for displaying said randomly selected outcome, and a second display device present at each of said plurality of gaming terminals for displaying said randomly selected player receiving said progressive payout.

41. The gaming system of claim 36, further comprising signage connected to said plurality of gaming terminals, said signage including a display device for displaying said progressive payout.

42. The gaming system of claim 36, further comprising signage connected to said plurality of gaming terminals, said signage including a display device for displaying said randomly selected player receiving said progressive payout.

43. The gaming system of claim 36, wherein said selection by said progressive game controller of said randomly selected player is displayed by live video feed to a display device attached to each of said plurality of gaming terminals.

44. The gaming system of claim 36, wherein said selection by said progressive game controller of said randomly selected player is displayed by live video feed to a display device attached to signage that is connected to said plurality of gaming terminals.

45. A method for playing a wagering game having a progressive payout, comprising:

providing a plurality of gaming terminals, each of said plurality of gaming terminals displaying said wagering game for achieving said progressive payout;

funding said progressive payout from a portion of wagering inputs received at said plurality of gaming terminals;

identifying a player who is playing for said progressive payout during a selected time period, said player not being awarded said progressive payout;

concluding said wagering game of said player at said one of said plurality of gaming terminals; and awarding said progressive payout to said player at a later time when said player is not present at any of said plurality of gaming terminals.

46. The method of claim 45, wherein said player is identified by presenting a tracking card.

47. The method of claim 45, wherein said player is identified by presenting a personal identification number.

48. The method of claim 45, wherein said player is identified by presenting a biometric marker.

49. The method of claim 45, wherein said concluding includes instructing said player that said player is still eligible for said progressive payout.

50. The method of claim 49, wherein said instructing of said player that said player is still eligible for said progressive payout occurs at said one of said plurality of gaming terminals.

51. The method of claim 45, further comprising randomly selecting said player after said concluding of said wagering game.

52. The method of claim 45, wherein said awarding of said progressive payout to said selected player at said later time includes displaying the name of said player on a display device at each of said plurality of gaming terminals.

53. The method of claim 45, wherein said awarding of said progressive payout to said selected player at said later time includes displaying the name of said player on a display device attached to signage that is connected to each of said plurality of gaming terminals.

* * * * *